Figure 1:
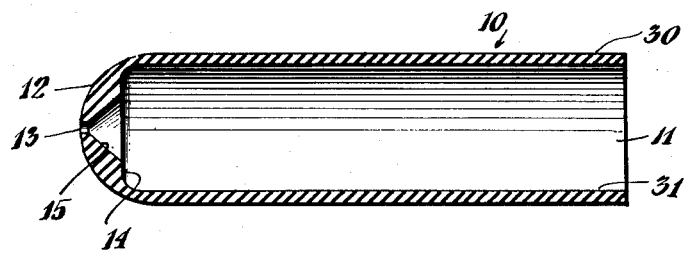

April 6, 1954  H. B. SCHOCH  2,674,646

SEALED ELECTRICAL CAPACITOR

Filed April 13, 1950

INVENTOR.
Henry Bernard Schoch
BY
Nicholas Lang

ATTORNEY

Patented Apr. 6, 1954

2,674,646

UNITED STATES PATENT OFFICE 2,674,646

SEALED ELECTRICAL CAPACITOR

Henry Bernard Schoch, Indianapolis, Ind., assignor to P. R. Mallory & Co., Inc., Indianapolis, Ind., a corporation of Delaware Application April 13, 1950, Serial No. 155,607

3 Claims. (Cl. 174—52)

This invention relates to electrical capacitors and the construction therefor.

It is highly desirable that for high frequency or television operation a quality type of electrostatic capacitor or the like be produced cheaply and in quantity. Heretofore, such attempts for producing such electrostatic capacitors have had several faults, namely, (a) the shelf life proved to be short; (b) the capacitors could not be used at temperatures greatly exceeding 85° C.; and (c) the wax dipping process necessary for moistureproofing and protecting the same created an unattractive type of construction.

As is known, the efficient operation of capacitors and other such electronic parts is affected adversely by moisture with the operation of these parts depending upon a permanent and hermetic sealing therefrom. Priorly, impregnated capacitor sections or tubes were assembled in paper containers, the ends of which were sealed with wax, with the whole assembly being dipped in a low melting mineral wax. Usually, these paper tubes were impregnated with mineral wax prior to assembly. Such a construction, although providing reasonable attempts at moisture resistance, seriously limited the ambient operating temperature of the capacitor. It was also found that there was overheating of local areas of the capacitor, as when the capacitor was close to or abutted a hot resistor element. This positional relationship to a heated component often resulted in melting the wax and seal of the capacitor with the consequent leakage of the impregnant of the capacitor. This results in a loss of efficiency in the capacitor and a failure thereof. Further, the structures heretofore observed did not withstand high temperatures and immersion cycling.

By the present invention, however, there is provided a novel construction for an electrostatic capacitor wherein the above deficiencies are corrected. The present invention provides an impregnated capacitor section in a plastic thimble wherein the section is embedded in a resin. This resin is bonded integrally with the thimble and adheres thereto to shrink tightly about the associated capacitor section leads.

It is, therefore, a prime object of the present invention, as illustrated by an embodiment thereof, to provide a novel molded thimble type of capacitor operative at high temperatures and adapted to be economically constructed and fabricated.

Still another object of the present invention is to provide a molded type capacitor having a novel construction adapted to provide substantially moistureproof efficient operation at high degrees of temperatures.

Still another object of the present invention is to provide, a novelly constructed capacitor, a resin adapted to circumscribe an impregnated capacitor section so as to provide efficient, economic and highly advantageous use thereof in high frequency circuits, such as television circuits and the like.

Still another object of the present invention is to provide an electrostatic capacitor construction having good moisture resistance and operative over a wide ambient temperature range.

Still another object of the present invention is to provide a novel method for constructing an electrostatic capacitor of substantially moistureproof character, said capacitor being operative over a wide ambient temperature range and adapted for use in high frequency circuits.

Another object of the present invention is to provide a liquid casting resin for bonding electrical capacitors and electronic parts and assemblies, in which said resin bonds integrally with an organic plastic case such as methylmethacrylate and polystyrene.

Other objects of the invention will become apparent from the following description taken in connection with the figures in the drawings.

Figure 2:
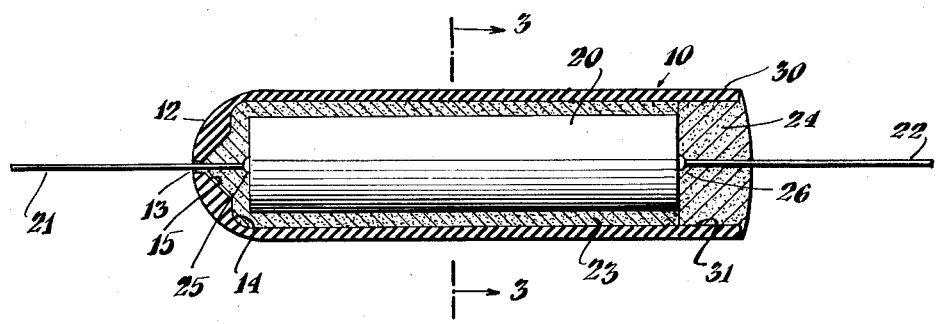
Figure 3:
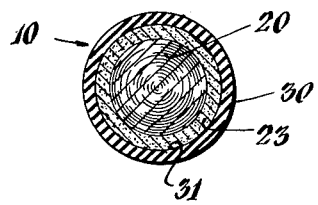

Referring now to the drawings,

Fig. 1 is an illustrative embodiment of the novel molded thimble or casing construction used in the invention, and Fig. 2 is a cross-sectional view of the novel electrical capacitor of the invention adapted to show the constructional features thereof as including an impregnated electrical capacitor section embedded in a potting compound utilized therein for moistureproofing the same and rigidly maintaining the said capacitor section therewithin;

Fig. 3 is a cross sectional view of the invention shown in Fig. 2 as taken along line 3—3 thereof.

As stated previously, the present novel construction of an electrical capacitor provides means for embedding an impregnated capacitor section in a novel plastic assembly whereby the entire assembly is operative at high temperatures and is substantially moistureproofed. The embedding resin is bonded to the thimble so as to adhere rigidly thereto and to shrink tightly about the leads of said impregnated capacitor section. There is, thus, provided a novelly constructed capacitor having good moisture resistance characteristics operable over wide temperature ranges so that ambient temperature variations have little influence thereover. The impregnated capacitor section having a pair of electric wire terminals is positioned within the plastic thimble shown in Fig. 1 of the drawing. This construction of the casing or thimble is adapted to allow the penetration therethrough of one of the terminals. As hereinafter described, the terminal is tightly circumscribed and closely bonded by the capacitor embedding resin in the container in a manner such as to avoid any moisture from obtaining access thereto. This resin or potting compound may be a chlorinated hydrocarbon compound characterized by non-flammability, high dielectric strength and resistivity, low vaporization loss and a stability towards heat, acids and alkalis. This resin, as stated, is placed about and circumscribes the said capacitor section so as to embed the said capacitor therewith while, at the same time, said resin is integrally bonded to the plastic thimble. The resin adheres to and shrinks tightly about the lead of the capacitor section.

In Fig. 1 there is disclosed a representative embodiment of the casing utilized in the present invention. Casing or molded thimble 10 comprises outside and inside walls 30, 31 and a tapered end section 12 having an aperture 13 centrally formed therethrough. Opposite said tapered end section 12 is disclosed an open end 11 of casing 10. The tapered section 12 of the casing comprises an annularly sloped surface or side 15 which ends in stop shoulder portions 14. It is to be noted that the central portion having aperture 13 may be initially entirely closed without having the aperture included therethrough, the aperture subsequently being formed by a suitable penetration of the lesser thickness at the center of said tapered section 12.

As shown in Figs. 2 and 3, an impregnated capacitor section 20 is fitted within said casing 10 so that a lead 21 is adapted to pass through aperture 13 of the tapered section 12 of the casing. Circumscribing said impregnated capacitor section 20 is a resin or potting compound 23 which embeds the same in a manner so as to completely surround the electrical capacitor section. Potting compound 23, utilized to embed capacitor section 20, has a composition such as polystyrene, styrene monomer, divinyl benzene, and chlorinated terphenyl, with or without a plasticizer such as hydrogenated terphenyl. The composition may have organic peroxides, preferably benzoyl peroxide, used to catalyze the polymerization of the resin at elevated or room temperatures. If said polymerization is to take place at room temperature, an accelerator may be used to hasten the curing time. Further, the constituents of this resin may be compounded to produce any degree of hardness, curing rate, thermoplastic and thermosetting characteristics. Thus, the resin may be compounded to be thermoplastic or thermosetting. Additively, the chemical resistance of the resin having the above composition may be varied as by varying the ingredients of the resin.

The above potting compound 23 of the resin is integrally bonded about leads 21 and 22 of the capacitor section connected thereto at ends 25 and 26. Compound 23 is bonded to inside wall 31 of the casing or thimble 10 and is adapted on curing, as hereinafter described, to rigidly and tightly maintain the same in a substantially hermetically sealed manner to prevent moisture from affecting the operation of the entire assembly.

As shown in Fig. 2, a closure 24 is formed for the open end 11 of casing 10, which closure may be formed of still another resin to form a topping for resin 23. Such a topping resin used as an overlay material is composed of styrene monomer, divinyl benzene, and polystyrene. A plasticizer, as hydrogenated terphenyl, may be added if desired. This overlay material may be used because the dielectric impregnant of the capacitor section may tend to migrate to the top of the potting compound so as to leave it soft and tacky. This topping has the characteristic of eliminating this condition by influencing the impregnant and thus provides a hard, tough, tack-free surface bonded to the plastic top surface of the thimble. In this manner, a construction for an electrical capacitor is provided which exhibits a hermetically sealed fabrication preventing moisture from attacking and lowering the efficiency of the assembly.

In a method used in the assembly of the above constructed tightly cured, substantially hermetically sealed capacitor, impregnated capacitor section 20 has its lead 21 heated so that it may, because of its heated condition, penetrate the central portion or aperture 13 of the tapered end of the casing. If this type of procedure is deemed inadvisable, aperture 13 may be initially cut out as provided by means of drilling a hole in the tapered end. The potting compound 23 is then poured into the casing 10 so as to partially fill the same. Capacitor section 20 is then immersed within potting compound 23 so as to have said compound completely circumscribed and to embed the same therewithin. If desired, the entire assembly may be constructed by fully pouring the potting compound into the casing 10 so as to substantially completely fill the same. However, if, as noted previously, the dielectric impregnant of the capacitor section contains excessive mineral oil, it may be necessary to provide a topping compound 31 to act as a closure for casing 10. This second topping compound provides a hard, tough surface which is tack-free and is adapted to tightly bond to inside surface 31 of casing 10 and adhere to lead 22 of capacitor section 20. The potting media is then cured to an elevated temperature such as approximately 85° C. for approximately one to two hours. In this manner there is provided a hermetically sealed electrical device which exhibits moisture-proof characteristics and which allows for the operation of said device at elevated temperatures for a considerable length of time.

The novel tightly cured, substantially hermetically sealed electrical capacitor assembly provided by the present invention is deemed merely to be illustrative and not exhaustive in scope and since many widely different embodiments of the invention may be made without departing from the scope thereof, it is intended that all matter contained in the above description and shown in the accompanying drawing shall be interpreted as illustrative and not in a limiting sense.

What is claimed is:

1. An electrical device comprising a unitary plastic casing having an outer and inner surface, said casing having an open end and a tapered closed end, said tapered closed end having inside stop shoulders and an aperture adapted to be formed substantially centrally at the apex thereof, the inside wall of said tapered end being inclined and interconnecting said aperture with said stop shoulders to form an inside wall of a variable thickness, an electrical component disposed within said casing, a plurality of straight terminals connected to opposed individual ends of said electrical component, one of said terminals adapted to fit through said center of said tapered end, a high temperature resin compound circumscribing said electrical component and embedding the same within said casing, the position of said component therewithin adapted to be maintained by the abutment of said resin against said stop shoulders and as determined by the thickness of the inclined surface of said tapered end, and a topping compound closing said open end of said casing and surrounding said other terminal whereby said entire component is hermetically sealed.

2. An electrical device comprising a unitary plastic casing having an outer and inner surface determining the thickness thereof, said casing having an open end and a tapered closed end, said tapered closed end being thinnest substantially at the center thereof, stop shoulders formed at the end of the inside wall of said tapered end, said wall being annularly inclined and interconnecting said center with said stop shoulders to form an inside wall for said tapered end of a variable thickness, an electrical component disposed within said casing, a plurality of straight terminals connected to opposed individual ends of said electrical component, one of said terminals adapted to penetrate said tapered end at the center thereof, a high temperature resin compound circumscribing said electrical component and embedding the same within said casing, said compound completely filling said tapered end, the position of said component within said casing adapted to be maintained by the cooling of said resin against said stop shoulders and the incline of said tapered end, and enclosure means for said open end of said casing surrounding said other terminal whereby said entire component is adapted to be hermetically sealed.

3. An electrical device comprising an unitary plastic casing having an outside and an inside wall, said casing having an open and a closed end, said closed end being tapered to a semi-spherical shape and having an annularly sloped inside surface, stop shoulders placed at the end of said annularly sloped surface, said tapered end thus having a variable inside wall thickness ending at said stop shoulders with said center of said tapered end being of lesser thickness than that of said stop shoulders, an electrical component having a pair of straight terminals placed at opposing ends thereof within said casing at a determined position therewithin, an aperture formed substantially centrally of said tapered end at the point of least thickness thereof, one of said terminals of said electrical component adapted to pass through said aperture of said tapered end, a high temperature resin compound circumscribing said component and being bonded to the inside wall of said casing, said compound completely filling said tapered end and abutting said shoulders, the position of said component within said casing thus being fixed upon the cooling of said compound within said casing and a second compound surrounding said other of said terminals tightly joining said first compound and placed in the open end of said casing adhering to the inner wall thereof whereby an electrical device is provided which exhibits a hermetically sealed fabrication preventing moisture from entering therewithin and lowering the efficiency of the device.

References Cited in the file of this patent

UNITED STATES PATENTS

| Number | Name | Date |
|---|---|---|
| 1,248,593 | Arnold | Dec. 4, 1917 |
| 1,637,090 | Rumble | July 26, 1927 |
| 1,763,115 | Wermine | June 10, 1930 |
| 1,924,435 | Homer | Aug. 29, 1933 |
| 2,183,550 | Deutschmann | Dec. 19, 1939 |
| 2,211,659 | Johanson | Aug. 13, 1940 |
| 2,444,880 | Robinson | July 6, 1948 |
| 2,596,134 | Dorst | May 13, 1952 |

FOREIGN PATENTS

| Number | Country | Date |
|---|---|---|
| 420,809 | Great Britain | Dec. 10, 1934 |
| 478,582 | Great Britain | Jan. 20, 1938 |
| 562,413 | Great Britain | June 30, 1944 |

OTHER REFERENCES

Publication "Plastics" July 1947, pages 57 through 59. (Copy available in Div. 48 of Patent Office.) 175–41M Lit.